United States Patent [19]

Ulich et al.

[11] Patent Number: 5,029,009

[45] Date of Patent: Jul. 2, 1991

[54] IMAGING CAMERA WITH ADAPTIVE RANGE GATING

[75] Inventors: Bobby L. Ulich, Tucson, Ariz.; R. Norris Keeler, McLean, Va.; Kent Phlibsen, Tucson, Ariz.

[73] Assignee: Kaman Aerospace Corporation, Bloomfield, Conn.

[21] Appl. No.: 365,133

[22] Filed: Jun. 12, 1989

Related U.S. Application Data

[63] Continuation-in-part of Ser. No. 348,804, May 8, 1989.

[51] Int. Cl.$^5$ .............................................. H04N 5/30
[52] U.S. Cl. ................................. 358/209; 358/213.26
[58] Field of Search ....................... 358/213.11, 213.26, 358/217–219, 209; 250/213 VT

[56] References Cited

U.S. PATENT DOCUMENTS

| | | | |
|---|---|---|---|
| 4,280,141 | 7/1981 | McCann et al. | 358/213.26 |
| 4,603,250 | 7/1986 | Contini et al. | 250/213 VT |
| 4,634,272 | 1/1987 | Endo | 356/152 |
| 4,727,427 | 2/1988 | Kime | 358/217 |
| 4,827,346 | 5/1989 | Hicks, Jr. | 358/217 |
| 4,837,631 | 6/1989 | Hicks, Jr. | 358/217 |
| 4,916,543 | 4/1990 | Crosby | 358/217 |

*Primary Examiner*—Stephen Brinich
*Attorney, Agent, or Firm*—Fishman, Dionne & Cantor

[57] ABSTRACT

Variable time delay range gating across an image is accomplished using a single imaging camera. In a preferred embodiment, the imaging camera of the present invention accomplishes adapted range gating and comprises a lens which focuses light onto a substrate having an array of gating electrodes mounted thereon. Both the electrode array and substrate are transparent to light so that the light focussed by the lens passes through the electrode array and substrate to strike a photocathode. The camera of this invention also includes a multiple output power supply connected between the electrode array and a microchannel plate amplifier, an anode, and an imaging array detector which is connected to the anode through a fiber optic bundle. The imaging camera of the present invention will effect adaptive range gating for overcoming the intensity variations and imaging plane problems associated with known light imaging detection and range (lidar) systems.

45 Claims, 3 Drawing Sheets

IMAGING CAMERA WITH ADAPTIVE RANGE GATING

This application is a continuation-in-part of U.S. Patent Application No. 348,804 filed May 8, 1989.

BACKGROUND OF THE INVENTION

This invention relates generally to imaging cameras. More particularly, this invention relates to a camera adapted to accomplish variable time delay range gating across a selected target scene.

The present invention will be described in conjunction with its utility in an imaging light detection and ranging (LIDAR) system. However, it will be appreciated that the present invention is not limited thereto in its utility and may be used in any other application requiring an imaging camera which accomplishes variable time delay range gating across an image.

A imaging light detection and ranging (LIDAR) system is generally depicted in FIG. 1. The LIDAR system of FIG. 1 is of the type described in U.S. Patent Application Ser. Nos. 216,341 filed July 7, 1988 (now U.S. Pat. No. 4,862,257) and 256,778 filed Oct. 12, 1988, both of which are assigned to the assignee hereof and incorporated herein by reference.

In the Lidar system of FIG. 1, a pulsed light source 10 (such as a pulsed laser) emits a brief intense illuminating Pulse of light 12 upon receiving a signal from timing electronics 14 (e.g. timing generator). After a time delay corresponding to the round trip propagation time $t=2Rn/c$ (where n is the index of refraction of the propagation medium, R is the target range and c is the velocity of light propagation in a vacuum); a second timing signal is sent from timing generator 14 to a range-gated camera 16. Upon receipt of this signal, camera 16 opens its shutter for a brief period $\delta t=(2n/c)(\delta R)$ seconds, whereby reflection images of all targets within the angular field of view 18 of camera 16 and within the range gate $\delta R$ are formed at the camera output.

As can be seen in FIG. 1, the surface of constant time delay is not planar, but is actually a sphere, a section of which is shown in the two-dimensional FIG. 1 as an arc of a circle 20.

However, for some applications, it is desired to image a plane (as opposed to a sphere) or other two-dimensional surface in target space, as shown by the dashed line 22 in FIG. 1. In current lidar systems, the time delay is constant over the entire field of view, resulting in the imaging of only an annulus 24 at target image plane 22. The light from the target plane areas inside and outside this annulus are received either before (inside area identified at 26) or after (e.g., outside areas identified at 28) the image from range R. Therefore, a large part of target plane 22 is not imaged by camera 16 in a single picture. Moreover, the picture which is imaged will vary in intensity for different values of range R if the propagation medium is not perfectly transparent.

SUMMARY OF THE INVENTION

The above-discussed and other drawbacks and deficiencies of the prior art are overcome or alleviated by the novel imaging camera of the present invention. In accordance with the present invention, variable time delay range gating across an image is accomplished using a single imaging camera. In a preferred embodiment, the imaging camera of the present invention accomplishes adaptive range gating and comprises a lens which focuses light onto an electrically insulating substrate having an array of gating electrodes mounted thereon. Both the electrode array and substrate are transparent to light so that the light focussed by the lens passes through the electrode array and substrate to strike a photocathode. The camera of this invention also includes a multiple output power supply connected between the electrode array and a microchannel plate amplifier located in an evacuated volume between the photocathode and an output phosphor anode. This anode is connected to the microchannel plate. The present invention also includes an imaging array detector which is connected to the anode through a fiber optic bundle.

The imaging camera of the present invention will effect adaptive range gating for overcoming the distortion and imaging plane problems discussed above with regard to the lidar system of FIG. 1.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES:

FIG. 5b is a plan view of an annular electrode array which can alternately be used instead of the square array shown in FIG. 5a.

DESCRIPTION OF THE PREFERRED EMBODIMENT

Figure 1:
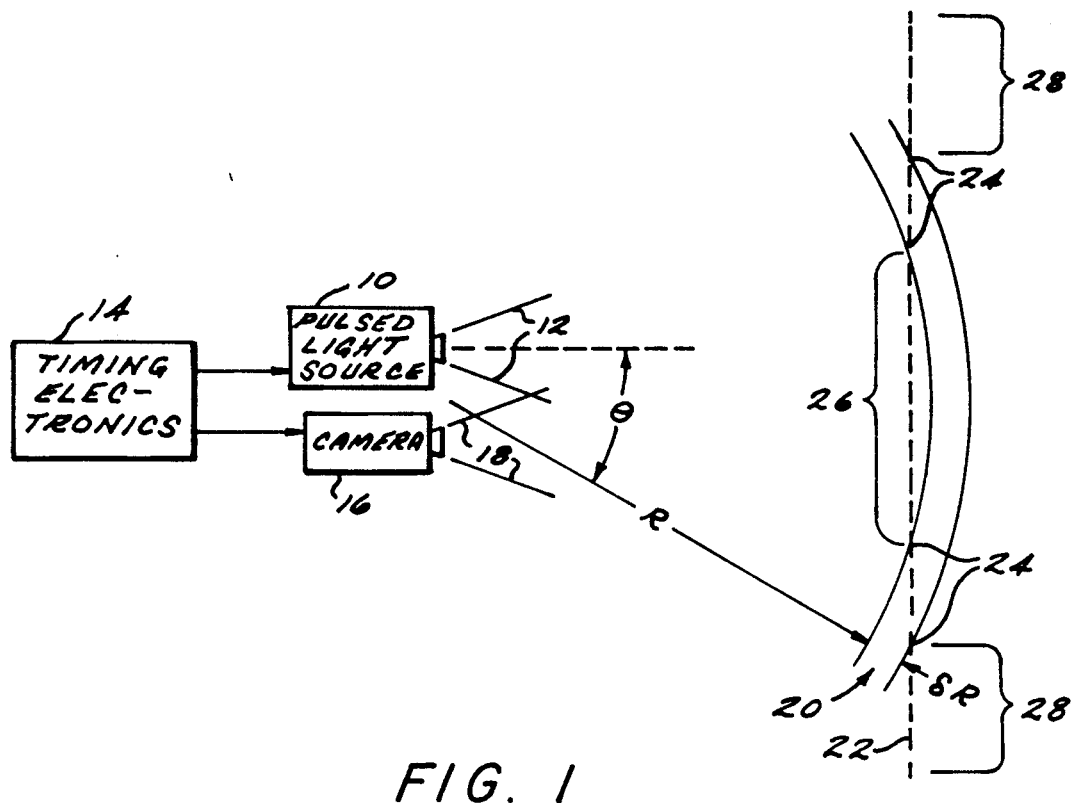
FIG. 1 is a schematic diagram of a known lidar system.
Figure 2A:
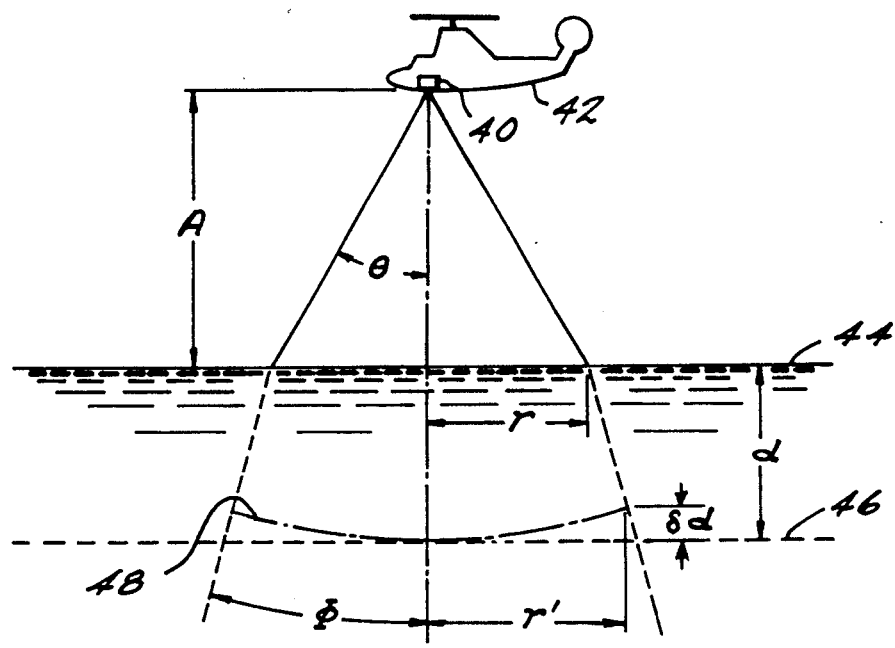
FIGS. 2a and 2b are schematic views of an airborne lidar system.
Figure 2B:
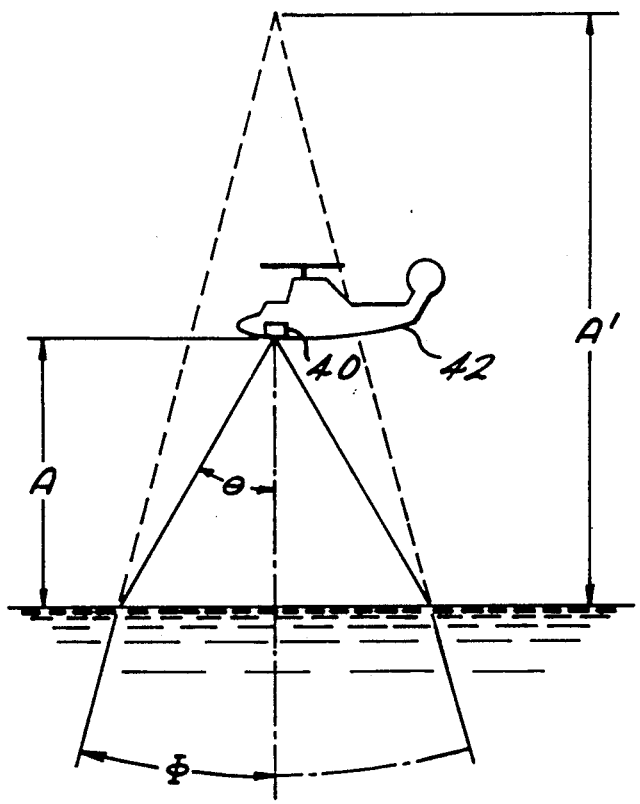

Airborne imaging lidar systems of the type depicted in FIG. 1 are used to observe the relatively flat surface of the land or water below the aircraft. As shown in FIG. 2a, it is often desirable to observe a submerged target image plane below the surface of a body of water. In FIG. 2a, the lidar system 40 is carried by an aircraft 42 at an altitude A above the water surface 44. The lidar system 40 has an angular field of view of half-angle $\theta$. It will be appreciated that if it is desired to image a target plane 46 at water depth d, the radius of the image on the water surface 44 is $r = A \tan \theta$. In the water, the camera field of view has half-angle $\Phi$ which is smaller than $\theta$ due to refraction at the water surface 44. For a lower medium with index of refraction n, $\sin\Phi = \sin\theta/n$. As a result of this refraction, the effective altitude of the image of the aircraft 42 as seen from underwater is $A'$ as depicted in FIG. 2b. The apparent altitude $A'$ is given by $$A' = \frac{A\sqrt{n^2 - \sin^2\theta}}{\cos\theta}.$$

Accordingly, the surface corresponding to a constant round trip propagation delay time $\tau = 2A/c + 2nd/c$ which is a sphere 48 above and tangent to plane 46 at depth d with radius $d + A'$. At the outer edge of the field of view (at angle $\theta$ from nadir), the sphere corresponding to constant time delay has a depth equal to $\delta d$ above plane 46 at radial distance 4'. This depth variation across the image can significantly degrade and modulate the intensity of the lidar system image.

The depth variation d is given by:

$$\delta d = d - \frac{[A + nd - \sqrt{A^2 + r^2}\,][n^2(A^2 + r^2) - r^2]^{\frac{1}{2}}}{n^2\sqrt{A^2 + r^2}}$$

at radius r' given by:

$$r' = r(1 - 1/n^2) + \frac{r(A + nd)}{n^2\sqrt{A^2 + r^2}}$$

For example, assume that A = 1500 ft and $\theta = 30°$. Then r = 866 ft and at a depth d = 175 ft for sea water (n = 1.343):

$$\Phi = 21.86°, \; r' = 867 \text{ ft}, \; A' = 2159 \text{ ft}.$$

From the equation above, $\delta d = 172$ ft, which is only 3 feet below the surface 44 of the water. This large radial variation in depth of penetration of the image into the water will cause large signal variations in both the intensity of reflected light from targets and in the intensity of light backscattered from the water itself.

In accordance with the imaging camera of the present invention, the image plane coverage limitations of the prior art are minimized to an acceptable level. In the camera of the present invention, different parts of the observed image are independently gated with separately controlled time delay signals. Thus, instead of the range gating shown in FIG. 3a which is obtained by using a prior art lidar system such as is depicted in FIG. 1, in accordance with the camera 50 of the present invention, an image is obtained such as that shown in FIG. 3b.

Figure 3A:
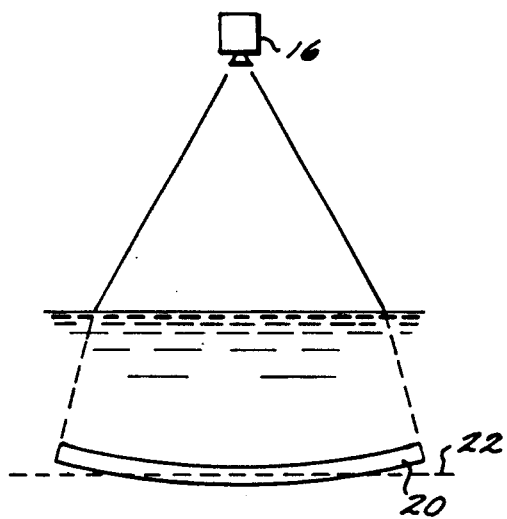
FIG. 3a is a schematic view depicting the image received by a camera in accordance with the prior art.
Figure 3B:
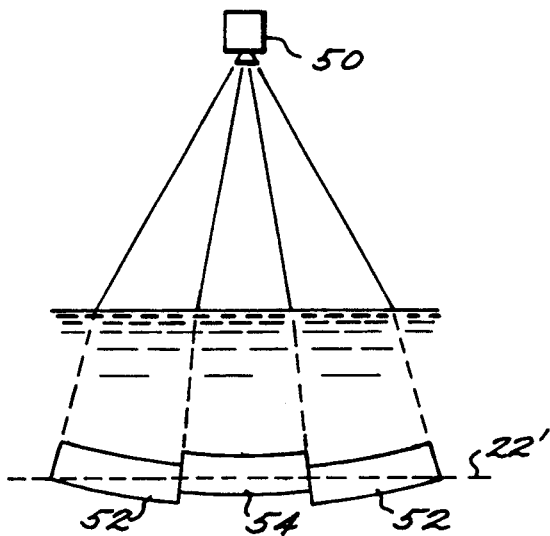
FIG. 3b is a schematic view depicting the image received by an adaptive range gating camera in accordance with the present invention.

In FIG. 3a, the lidar system of FIG. 1 images the volume 20 which intersects only part of the desired target image plane 22. In FIG. 3b, the improved lidar system of the present invention comprises a camera 50 which includes independently controlled delays for camera exposure control over parts of the image (hereinafter referred to as subimages). These delays may be longer near the edges of the field of view (zones 52 in FIG. 3b) than in the center of the field of view (zone 54 in FIG. 3b). In accordance with the present invention and as a result of novel camera 50, all of target plane 22' will now be visible in the camera image with only small variations in image brightness across the entire field of view.

The subimages may form a mosaic in one or two dimensions depending on the desired aspect ratio of the entire image. By making a larger number of independently gated camera zones, a better approximation to uniform depth of penetration may be achieved.

The independent control of gating of subimages may be made adaptive by sensing the parameters $A, \theta$, and $d$ with a computer. The computer then calculates the total round trip delay time for each electrode zone as a function of the subimage angle $\theta$ away from the nadir using the following equation:

$$\tau = (2A)/(c \cdot \cos\theta) + (2n^2 d)/[c(n^2 - (\sin\theta)^2)^{1/2}]$$

In some applications it may be useful to fix $\theta$ to one of several values and to vary A and d. Thus, $\tau = c_1 A + c_2 d$ which depends linearly on A and on d and is therefore easy to compute (e.g., A is known from the aircraft altimeter and d is the desired image plane depth under user control).

Figure 4:
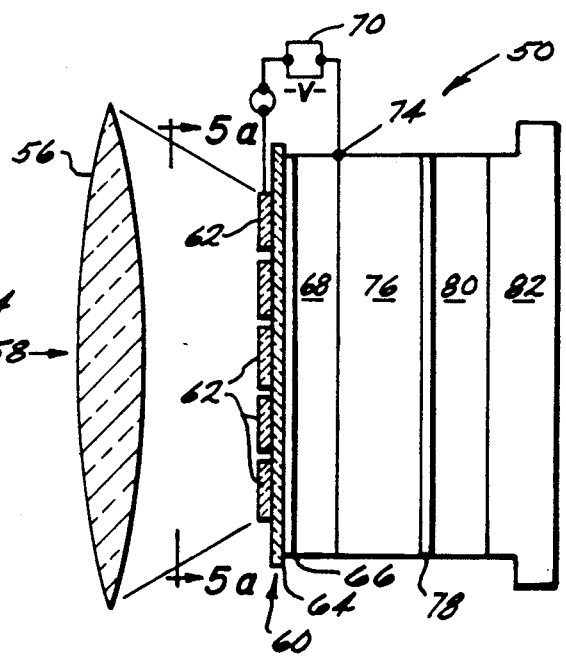
FIG. 4 is a side elevation view, partly in cross section, of an adaptive range gating camera in accordance with the present invention.

A camera in accordance with the present invention employing controllable subimage gating is shown in FIG. 4. In FIG. 4, a lens 56 focuses light 58 from a distant target onto a focal plane 60. Focal plane 60 includes an array of rectangular or annular shaped, electrically isolated gating electrodes 62 which are spaced from each other and mounted on an insulating substrate 64. Both the array of electrodes 62 and substrate 64 are transparent to visible light. The light 58 is focused by lens 56 and therefore passes through the array of electrodes 62 and the substrate 64 and strikes a photocathode 66 where, depending on the quantum efficiency of photocathode 66, electrons are ejected and enter the space 68 behind the Photocathode (which is evacuated).

A variable output power supply 70 applies a potential between one of the gating electrodes 62 and an input 74 to a microchannel plate amplifier 76. If electrode 62 is biased negative with respect to the microchannel plate output, the electrons are accelerated toward microchannel plate 76 and enter said plate. Microchannel plate 76 acts to amplify the current by a large factor (approx. $10^5$) before striking an anode 78. Anode 78 comprises a phosphor which emits visible wavelength photons when struck by energetic electrons. This anode light is carried by a fiber optic bundle 80 to an imaging array detector 82 which is read out electronically after the anode light output has decayed.

If voltage source 70 is set to positively bias the electrode array 62 with respect to microchannel plate 76, the electrons will not be accelerated toward microchannel plate 76 and camera 50 will be turned off. With a negative bias, camera 50 will be turned on over the area of the particular electrode 62. Some gaps will inevitably appear as a result of the necessity of electrically isolating each individual gating electrode 62 and its lead trace 84 (see FIGS. 5a and 5b) to the outer edge of substrate 64. These gaps will produce small unexposed strips or gaps in the final image at the array detector 82.

Figure 5B:
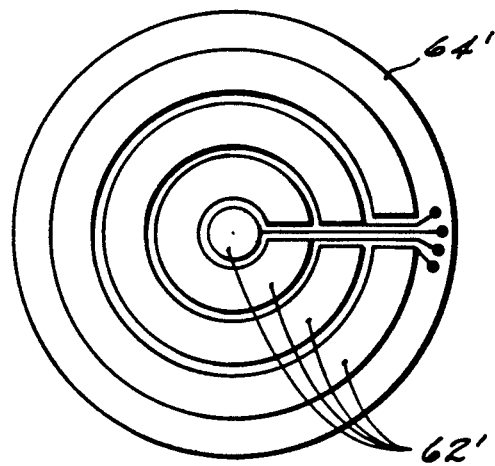
Figure 5A:
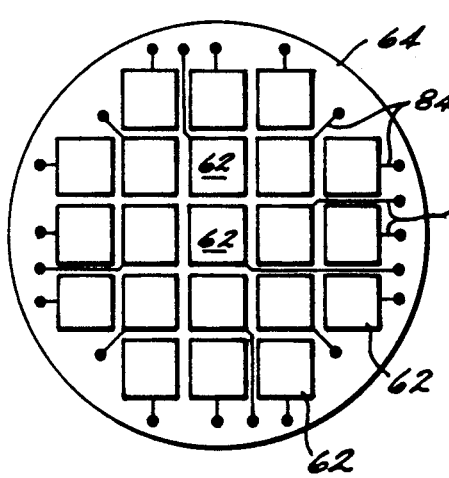
FIG. 5a is a plan view taken along the line 5a—5a of FIG. 4.

In FIG. 5a, the electrodes 62 are rectangular patches and in FIG. 5b the electrodes 62' are annuli. The annular array geometry in FIG. 5b would be preferred when viewing an image plane which is perpendicular to the optical axis of camera 50. The rectangular array of FIG. 5a would be employed when the image plane is not perpendicular to the optical axis of camera 50. Of course, other shaped electrodes 62 and electrode geometries could also be employed depending on the application. The optimum shape of the electrodes will follow the contours of constant time delay which image sections of the target scene.

Figure 6:
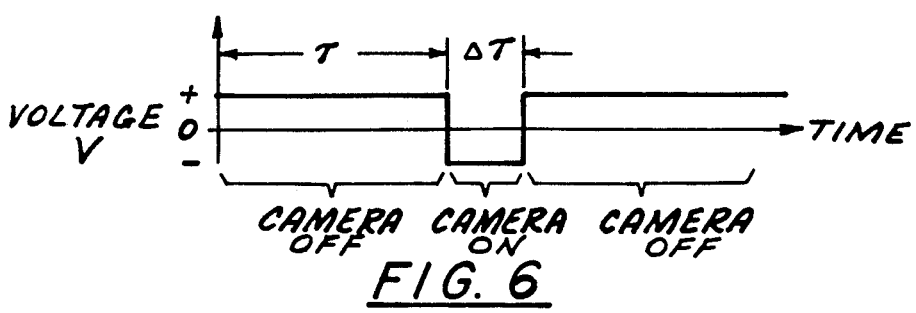
FIG. 6 is a graph depicting the gating voltage waveform for the camera of FIG. 5a or 5b.

In a preferred embodiment, each electrode 62 or 62' is gated with a separately controlled voltage source having the waveform shown in FIG. 6.

The several components of camera 50 are all known and may be comprised of commercially available materials and/or devices. For example, each electrode 62 in the electrode array may consist of a metal mesh or a thin coating or deposition of a metal such as gold. Substrate 64 may be comprised of a sheet of glass. Photocathode 66 may be comprised of a multiple alkali chemical coating. Microchannel plate 76 is commercially available from Galileo Electro-Optics Corporation of Sturbridge, Mass. Anode 14 is a phosphorescent coating inside a glass substrate. Imaging array detector 88 may be comprised of a known charge coupled device (CCD) or charge injection device (CID).

It may be convenient and therefore preferred to group together a number of electrodes 62 which will, in general, have the same value of time delay ↑. For a lidar system viewing the nadir, electrode patches may be connected which have equal radial distances from the center of the array. Grouping electrodes in this way reduces the number of independent voltage source required and thereby simplifies the electronics (at some cost of slight degradation of depth matching).

A computer controlled time delay generator with multiple outputs may be used to produce variable time delays across each image according to the methods described herein. Thus, camera 16 of the lidar system of FIG. 1 (or the lidar systems described in U.S. Patent Application Ser. Nos. 216,341 (now U.S. Pat. No. 4,862,257) and 256,778) may be replaced with camera 50 of the present invention to achieve variable time delay range gating across a selected image.

The present invention provides many features and advantages already discussed above including simplified system design and accurate registration of subimages.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An imaging camera comprising:
   focal plane means for viewing an image, said focal plane means including a plurality of gating electrodes; and
   means for selectively gating one or more of said gating electrodes and producing variable time delay of exposure and variable duration of exposure across an image viewed by said focal plane means.

2. The camera of claim 1 wherein said gating electrodes are spaced and electrically isolated from each other and wherein said focal plane means further includes:
   a substrate, said gating electrodes being mounted on said substrate; and
   a photocathode, said substrate being mounted on said photocathode.

3. The camera of claim 2 wherein:
   said gating electrodes and said substrate are transparent to visible light.

4. The camera of claim 1 including:
   focussing lens means in communication with said focal plane means wherein said lens means focusses light onto said focal plane means.

5. The camera of claim 1 wherein:
   said gating electrodes are arranged in an array of columns and rows.

6. The camera of claim 1 wherein:
   said gating electrodes are arranged in a set of concentric annular zones.

7. The camera of claim 2 wherein:
   said substrate includes a peripheral edge and wherein each of said gating electrodes includes a discrete trace which terminates near said edge.

8. The camera of claim 1 wherein:
   each of said electrodes is rectangular.

9. The camera of claim 1 including:
   electron amplifier means communicating with said focal plane means, said amplifier means accelerating electrons received from said focal plane means.

10. The camera of claim 9 including:
    an evacuated space between said focal plane means and said amplifier means.

11. The camera of claim 9 wherein:
    said amplifier means comprises microchannel plate amplifier means.

12. The camera of claim 1 including:
    power supply means connected to said gating electrodes, said power supply means selectively gating said gating electrodes.

13. The camera of claim 12 wherein:
    said power supply means comprises a Plurality of variable supply voltage sources, each of said gating electrodes being gated with one of said voltage sources.

14. The camera of claim 1 including:
    anode means communicating with said focal plane means, said anode means receiving electrons from said focal plane means and converting said electrons to visible wavelength photons.

15. The camera of claim 14 including:
    fiber optic means connecting said anode means to imaging array detector means.

16. The camera of claim 14 wherein:
    said anode means comprises a phosphor.

17. The camera of claim 14 including:
    imaging array detector means communicating with said anode means for converting said visible wavelength photons to electronic signals.

18. The camera of claim 17 wherein:
    said imaging array detector means is selected from the group consisting of a charge coupled device and a charge injection device.

19. The camera of claim 1 wherein:
    groups of said plurality of electrodes are interconnected so that electrodes in a selected group may be simultaneously gated.

20. The camera of claim 19 wherein said electrodes are arranged in an array and wherein said array includes a center and wherein:
    gating electrodes in an interconnected group of electrodes are substantially equally radially spaced from said center of said array.

21. The camera of claim 1 wherein said means for selectively gating one or more gating electrodes and producing variable time delay gating across an image viewed by said focal plane means comprises:
    time delay generator control means.

22. An imaging camera comprising:
    focal plane means, said focal plane means including a plurality of spaced, electrically isolated gating electrodes mounted on a substrate, said substrate being mounted on a photocathode, said gating electrodes and said substrate being transparent to visible light;

electron amplifier means communicating with said focal plane means, said amplifier means accelerating electrons received from said focal plane means;

power supply means connected between said gating electrodes and said amplifier means, said power supply means selectively gating said gating electrodes;

anode means communicating with said amplifier means, said anode means receiving accelerated electrons from said amplifier means and converting said electrons to visible wavelength photons; and imaging array detector means communicating with said anode means for converting said visible wavelength photons to electronic signals.

23. The camera of claim 22 including:

means for selectively gating one or more of said gating electrodes and producing variable time delay gating across an image viewed by said focal plane means.

24. An apparatus for detecting and imaging an object enveloped by a backscattering medium which is at least partially transmitting to light comprising:

generating means for selectively generating short pulses of light;

projecting means for projecting said short pulses of light toward the backscattering medium and at an object enveloped by the medium;

detecting means for detecting said pulses of light reflected back from said object after a time delay corresponding to the round-trip propagation time of said light pulses to and from said object; and converting means for converting said detected pulses of light to a video image of said object;

wherein said detecting means further comprises;

focal plane means for viewing an image, said focal plane means including a plurality of gating electrodes; and means for selectively gating one or more of said gating electrodes and producing variable time delay gating across an image viewed by said focal plane means.

25. The camera of claim 24 wherein said gating electrodes are spaced and electrically isolated from each other and wherein said focal plane means further includes:

a substrate, said gating electrodes being mounted on said substrate; and a photocathode, said substrate being mounted on said photocathode.

26. The camera of claim 25 wherein:

said gating electrodes and said substrate are transparent to visible light.

27. The camera of claim 24 wherein:

said gating electrodes are arranged in an array of columns and rows.

28. The camera of claim 24 wherein:

said gating electrodes are arranged in a set of concentric annular zones.

29. The camera of claim 24 including:

means for selectively gating one or more of said gating electrodes and producing variable time delay gating across an image viewed by said focal plane means.

30. A method of detecting and imaging an object enveloped by a backscattering medium which is at least partially transmitting to light including the steps of:

selectively generating short pulses of light;

projecting said short pulses of light toward the backscattering medium and at an object enveloped by the medium;

detecting said pulses of light reflected back from said object after a time delay corresponding to the round-trip propagation time of said light pulses to and from said object; and converting said detected pulses of light to a video image of said object;

wherein said step of detecting said reflected pulses of light further includes using detecting means comprising;

focal plane means for viewing an image, said focal plane means including a plurality of gating electrodes; and means for selectively gating one or more of said gating electrodes and producing variable time delay gating across an image viewed by said focal plane means.

31. The method of claim 30 including:

selectively gating one or more of said gating electrodes and producing variable time delay gating across an image viewed by said focal plane means.

32. An imaging camera comprising:

focal plane means for viewing an image, said focal plane means including a plurality of gating electrodes, said gating electrodes being spaced and electrically isolated from each other and wherein said focal plane means further includes a substrate and a photocathode, said gating electrodes being mounted on said substrate and said substrate being mounted on said photocathode; and means for selectively gating one or more of said gating electrodes and producing variable time delay gating across an image viewed by said focal plane means.

33. The camera of claim 32 wherein:

said gating electrodes and said substrate are transparent to visible light.

34. The camera of claim 32 wherein:

said substrate includes a peripheral edge and wherein each of said gating electrodes includes a discrete trace which terminates near said edge.

35. An imaging camera comprising:

focal plane means for viewing an image, said focal plane means including a plurality of gating electrodes, said gating electrodes being arranged in a set of concentric annular zones; and means for selectively gating one or more of said gating electrodes and producing variable time delay gating across an image viewed by said focal plane means.

36. An imaging camera comprising:

focal plane means for viewing an image, said focal plane means including a plurality of gating electrodes;

means for selectively gating one or more of said gating electrodes and producing variable time delay gating across an image viewed by said focal plane means; and electron amplifier means communicating with said focal plane means, said amplifier means accelerating electrons received from said focal plane means.

37. The camera of claim 36 including:

an evacuated space between said focal plane means and said amplifier means.

38. The camera of claim 36 wherein:

said amplifier means comprises microchannel plate amplifier means.

39. An imaging camera comprising:

focal plane means for viewing an image, said focal plane means including a plurality of gating electrodes;

means for selectively gating one or more of said gating electrodes and producing variable time delay gating across an image viewed by said focal plane means;

power supply means connected to said gating electrodes, said power supply means selectively gating said gating electrodes; and said power supply means comprising a plurality of variable supply voltage sources, each of said gating electrodes being gated with one of said voltage sources.

40. An imaging camera comprising:

focal plane means for viewing an image, said focal plane means including a plurality of gating electrodes;

means for selectively gating one or more of said gating electrodes and producing variable time delay gating across an image viewed by said focal plane means; and anode means communicating with said focal plane means, said anode means receiving electrons from said focal plane means and converting said electrons to visible wavelength photons.

41. The camera of claim 40 including:

fiber optic means connecting said anode means to imaging array detector means.

42. The camera of claim 40 wherein:

said anode means comprises a phosphor.

43. The camera of claim 40 including:

imaging array detector means communicating with said anode means for converting said visible wavelength photons to electronic signals.

44. The camera of claim 43 wherein:

said imaging array detector means is selected from the group consisting of a charge coupled device and a charge injection device.

45. An imaging camera comprising:

focal plane means for viewing an image, said focal plane means including a plurality of gating electrodes arranged in an array, said array having a center;

means for selectively gating one or more of said gating electrodes and producing variable time delay gating across an image viewed by said focal plane means; and wherein groups of said plurality of electrodes are interconnected so that electrodes in a selected group may be simultaneously gated and wherein gating electrodes in an interconnected group of electrodes are substantially equally radially spaced from said center of said array.

* * * * *

UNITED STATES PATENT AND TRADEMARK OFFICE
CERTIFICATE OF CORRECTION

PATENT NO. : 5,029,009
DATED : July 2, 1991
INVENTOR(S) : Bobby L. Ulich, R. Norris Keeler, and Kent Phlibsen It is certified that error appears in the above-identified patent and that said Letters Patent is hereby corrected as shown below:

| | |
|---|---|
| Col. 1, line 29 | Delete "Pulse" and insert therefore --pulse--. |
| Col. 3, line 12 | Delete "4'" and insert therefore --r'--. |
| Col. 4, line 8 | In the equation, delete "178" and insert therefore --½--, such that the equation reads $\tau = (2A)/(c \cdot \cos\theta) + (2n^2 d)/[c(n^2 - (\sin\theta)^2)^{\frac{1}{2}}]$ |
| Col. 4, line 28 | Delete "Photocathode" and insert therefore --photocathode--. |
| Col. 5, line 16 | Delete "т" and insert therefore --τ--. |
| Col. 5, line 20 | Delete "source" and insert therefore --sources--. |
| Col. 6, line 26 | Delete "Plurality" and insert therefore --plurality--. |

Signed and Sealed this

Nineteenth Day of October, 1993

Attest:

BRUCE LEHMAN

Attesting Officer    Commissioner of Patents and Trademarks